UNITED STATES PATENT OFFICE.

HEINRICH THRON, OF FRANKFORT-ON-THE-MAIN, GERMANY, ASSIGNOR TO VEREINIGTE CHININFABRIKEN ZIMMER & CO., GESELLSCHAFT MIT BESCHRÄNKTER HAFTUNG, OF FRANKFORT-ON-THE-MAIN, GERMANY.

SALICYLATE OF SALICYL QUININ, &c.

SPECIFICATION forming part of Letters Patent No. 698,079, dated April 22, 1902.

Application filed January 8, 1902. Serial No. 88,931. (No specimens.)

*To all whom it may concern:*

Be it known that I, HEINRICH THRON, a subject of the Emperor of Germany, and a resident of Frankfort-on-the-Main, Germany, have invented certain new and useful Improvements in Pharmaceutical Products, of which the following is a specification.

My invention relates to the production of hitherto unknown derivatives of the salicylic-acid ether of cinchona alkaloids.

According to my researches salicylic-acid ethers of cinchona alkaloids still possess basic character and are capable of forming combinations with inorganic and organic acids.

The salicylic-acid ethers of cinchona alkaloids are of great value as medicinal preparations. By combining these products with acids their therapeutic effect is modified and new substances are produced which show very remarkable properties. On using, for instance, one molecule of salicylic-acid ether of quinin and one molecule of salicylic acid the new salicylate of salicylquinin is obtained, which is tasteless and exercises, besides the effect of quinin and salicylic acid, a peculiar medicinal effect, differing from that of either constituent. The average dose employed for medicinal purposes is about one gram.

In carrying out my new process practically I can proceed as follows: 44.4 kilograms of salicylquinin are dissolved in one hundred and thirty kilograms of alcohol, and 13.8 kilograms of salicylic acid are added to the hot solution. During the cooling the new salicylate of salicylquinin crystallizes out of the solution in white fine crystals and can then be separated from the mother liquor by filtering.

The new salicylate of salicylquinin has most probably the formula

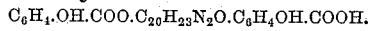
$C_6H_4.OH.COO.C_{20}H_{23}N_2O.C_6H_4OH.COOH.$

It forms white crystals which are tasteless, melt at 182° to 183° centigrade, and are insoluble in water, ether, and ligroin, but readily soluble in benzene, chloroform, and hot alcohol.

Instead of the salicylic-acid ether of quinin, salicylic-acid ethers of other cinchona alkaloids may be employed.

Having now described my invention and in what manner the same is to be performed, what I claim as new, and desire to secure by Letters Patent, is—

1. The herein-described new products prepared from one molecule of salicylic acid and one molecule of a salicylic-acid ether of cinchona alkaloids forming tasteless white crystals, insoluble in water, ether and ligroin but readily soluble in benzene, chloroform and hot alcohol.

2. The herein-described new product prepared from one molecule of salicylic acid and one molecule of salicylic-acid ether of quinin forming tasteless white crystals melting at 182° to 183° centigrade insoluble in water, ether and ligroin, but readily soluble in benzene, chloroform and hot alcohol.

In testimony whereof I have signed my name in the presence of two subscribing witnesses.

HEINRICH THRON.

Witnesses:
  WILHELM EITEL,
  THEOPHIL REZELMANN.